(12) United States Patent
Shen

(10) Patent No.: US 10,402,142 B2
(45) Date of Patent: Sep. 3, 2019

(54) INTERACTIVE FLAT PANEL DISPLAY WITH INTEGRATED DOCUMENT CAMERA

(71) Applicant: Pathway Innovations and Technologies, Inc., San Diego, CA (US)

(72) Inventor: Ji Shen, San Diego, CA (US)

(73) Assignee: Pathway Innovations and Technologies, Inc., San Diego, CA (US)

( * ) Notice: Subject to any disclaimer, the term of this patent is extended or adjusted under 35 U.S.C. 154(b) by 0 days.

(21) Appl. No.: 15/415,265

(22) Filed: Jan. 25, 2017

(65) Prior Publication Data

US 2017/0235535 A1    Aug. 17, 2017

Related U.S. Application Data

(60) Provisional application No. 62/286,960, filed on Jan. 25, 2016.

(51) Int. Cl.
| | |
|---|---|
| *H04N 1/00* | (2006.01) |
| *G09G 3/20* | (2006.01) |
| *G06F 3/14* | (2006.01) |
| *G06F 1/16* | (2006.01) |

(52) U.S. Cl.
CPC .......... *G06F 3/1423* (2013.01); *G06F 1/1632* (2013.01); *H04N 1/00204* (2013.01); *H04N 1/00267* (2013.01)

(58) Field of Classification Search
None
See application file for complete search history.

(56) References Cited

U.S. PATENT DOCUMENTS

| | | | | |
|---|---|---|---|---|
| 5,568,963 A * | 10/1996 | Bennett | ................. | F16M 11/42 312/10.1 |
| 6,286,794 B1 * | 9/2001 | Harbin | ................. | A47B 21/02 248/123.2 |
| 6,695,270 B1 * | 2/2004 | Smed | ................. | F16M 11/10 248/274.1 |
| 7,833,102 B2 * | 11/2010 | Beadell | ................. | G07F 17/32 463/46 |
| 2001/0048464 A1 * | 12/2001 | Barnett | ................. | H04N 7/142 348/14.08 |
| 2005/0239037 A1 * | 10/2005 | Lertsithichai | ................. | A47B 19/10 434/365 |
| 2010/0275132 A1 * | 10/2010 | Hildebrandt | ................. | G06F 1/1605 715/752 |
| 2012/0033375 A1 * | 2/2012 | Madonna | ................. | F16M 11/041 361/679.43 |
| 2014/0070059 A1 * | 3/2014 | Vieira | ................. | F16M 11/041 248/122.1 |

(Continued)

*Primary Examiner* — Bryan Earles
(74) *Attorney, Agent, or Firm* — Trevor Coddington; San Diego IP Law Group LLP

(57) ABSTRACT

An interactive flat panel display is provided with an integrated document camera, embedded computer, and additional touch screen panel in one complete system that facilitates an engaging, interactive and collaborative learning experience. The embedded computer and/or document camera provides content to the flat panel display and the additional touch screen display thereby allowing the user to interact with programs, computer applications, websites, etc. through the touch screen capabilities of the displays.

10 Claims, 5 Drawing Sheets

(56) References Cited

U.S. PATENT DOCUMENTS

2015/0227267 A1* 8/2015 Jarema, III ............ F16M 11/00 715/719
2015/0301633 A1* 10/2015 Nakamura ............ G06F 3/0488 345/173
2017/0315648 A1* 11/2017 Lin ....................... G06F 3/0412

* cited by examiner

INTERACTIVE FLAT PANEL DISPLAY WITH INTEGRATED DOCUMENT CAMERA

CROSS REFERENCE TO RELATED APPLICATION

This present invention claims priority to U.S. Provisional Patent Application No. 62/286,960, filed on Jan. 25, 2016, and entitled, "Interactive Flat Panel Display with Integrated Document Camera," the disclosure of which is incorporated by reference herein in its entirety.

BACKGROUND OF THE INVENTION

1. Field of Invention

The present invention relates to interactive flat panel displays and more specifically, to an interactive flat panel display with an integrated document camera and a secondary touch screen.

2. Description of Related Art

Interactive touch screen displays are becoming increasingly ubiquitous in the modern classroom setting. Today's classrooms have progressed from blackboards and whiteboards to interactive flat panel displays (IFPD) providing new ways of learning and collaboration. The IFPD receives content over a network, a connected computer, and/or an imaging device. The touch screen capabilities of the IFPD allow teachers and students to interact seamlessly with the displayed content, i.e., a website, application, teaching module, video, etc.

Typically, the IFPD may be mounted directly on a wall or may be part of a portable mounting stand. External devices such as a computer or imaging device are then connected to the IFPD via universal serial bus (USB) or high-definition multimedia interface (HDMI) ports. This configuration, while functional, can be problematic within the confines of a classroom or boardroom with the additional cables and devices. Moreover, the user of an IFPD is forced to turn their back towards the audience while interacting with the IFPD, which in turn diminishes the interactive and collaborative connection with said audience.

A need therefore exists for an IFPD with an integrated document camera, computer, and/or additional touch screen panel. The integrated devices eliminate exposed cabling, and the additional touch screen panel facilitates continuity during the interactive and collaborative connection with an audience.

SUMMARY OF THE INVENTION

The present invention provides an interactive flat panel display (IFPD) with an integrated document camera, embedded computer, and additional touch screen panel in one complete system that facilitates an engaging, interactive and collaborative learning experience. The IFPD device comprises a large flat panel display having interactive touch screen capabilities; a portable mounting apparatus for supporting the IFPD, the portable mounting apparatus capable of adjusting the height of the IFPD; a podium surface connected to the portable mounting apparatus via a hinged suspension arm, the podium surface pivotable about a horizontal and vertical axis; an embedded computer dedicated to the IFPD; a second touch screen panel connected to the embedded computer; and an optional image capture device (i.e., document camera) connected to the embedded computer. The embedded computer and/or image capture device provides content to the flat panel display and the second touch screen display thereby allowing the user to interact with programs, computer applications, websites, etc. through the touch screen capabilities of the displays. In a preferred embodiment, the second touch screen panel is located within the podium surface providing the user the ability to interact with the content on the flat panel display while maintaining a connection with the audience. The image capture device may be, for example, a video camera or a document camera, or a like visual presenter. The embedded computer facilitates communications between the flat panel display, the second touch screen display, and the image capture device. The embedded computer also synchronizes the content displayed on the flat panel display and the second touch screen panel.

In an embodiment of the invention, an interactive flat panel display (IFPD) device comprises: a flat panel display comprising a first interactive touch screen; a portable mounting apparatus supporting the flat panel display; a podium structurally coupled to the portable mounting apparatus; a computer structurally coupled to the portable mounting apparatus, wherein the computer comprises a second interactive touch screen and is electronically coupled to the flat panel display; and wherein the computer provides content to the flat panel display and synchronizes display on the first interactive touch screen and display on the second interactive touch screen. The height of the flat panel display is adjustable via the portable mounting apparatus. The podium is pivotable about a horizontal and vertical axis. The IFPD device may further comprise an image capture device electronically coupled to the computer. The image capture device may be a document camera. The second interactive touch screen is located within the podium and is configured to interact with content on the flat panel display. The portable mounting apparatus comprises wheels.

An advantage of the present invention is that it provides a fully integrated IFPD device that enhances the interactive learning experience by keeping the presenter and audience engaged.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF EMBODIMENTS

Figure 1:
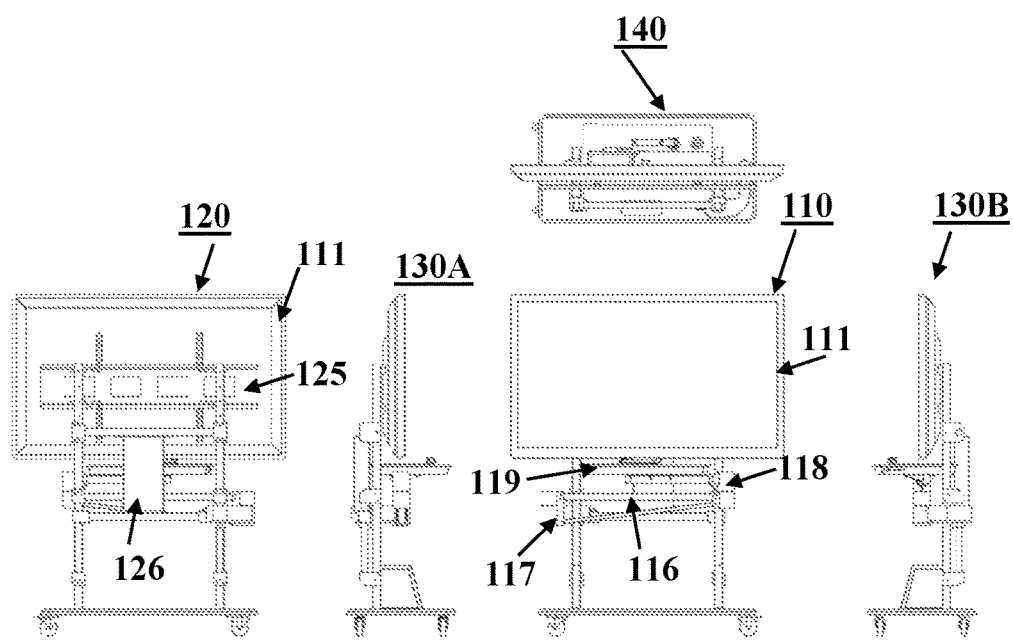
FIGS. 1A and 1B illustrate a front, rear, top, and side view of a fully integrated IFPD device with the podium surface in a retracted and extended position, respectively, according to an embodiment of the invention.
Figure 1:
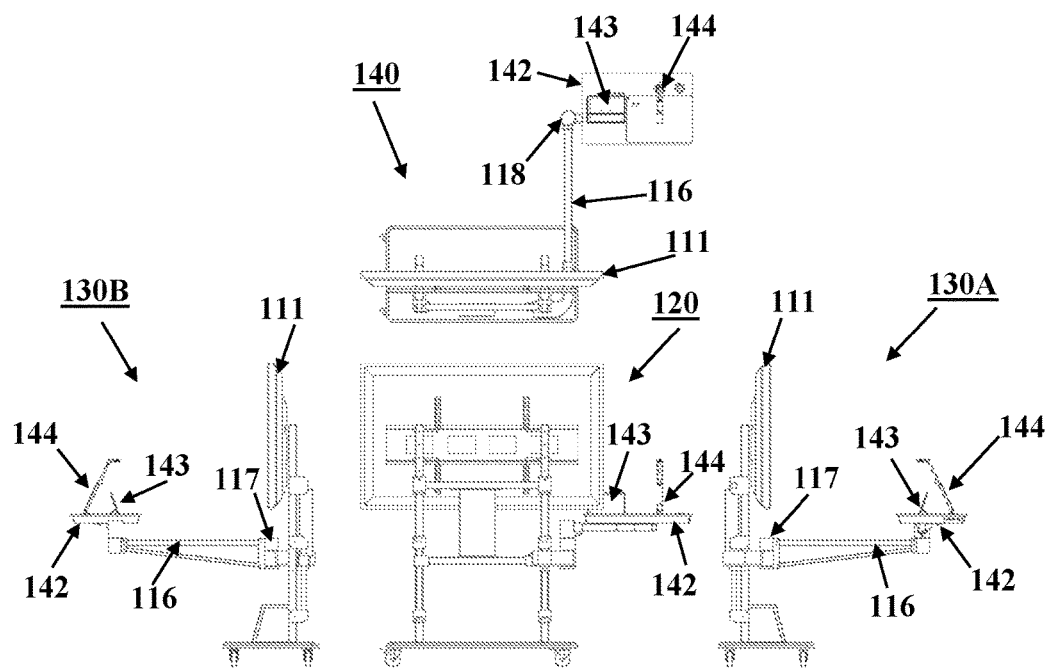

Further features and advantages of the invention, as well as the structure and operation of various embodiments of the invention, are described in detail below with reference to the accompanying FIGS. 1-5, wherein like reference numerals refer to like elements.

FIGS. 1A and 1B illustrate a front, rear, top, and side view of a fully integrated IFPD device with the podium surface in a retracted and extended position, respectively, according to an embodiment of the invention. FIG. 1A illustrates multiple views of the fully integrated IFPD device 100. The fully integrated IFPD device 110 includes a flat panel display 111, which can be any flat panel display with touch screen capabilities known to one of ordinary skill in the art. In an alternative embodiment, the flat panel display 110 may be any pre-existing flat panel display and fitted with an interactive display overlay known to one of ordinary skill in the art. For example, any LCD or plasma television may be converted to an IFPD by overlaying the television panel with an interactive display overlay.

The IFPD device of the present invention is portable and may include wheels 115. A podium surface 119 is connected to the IFPD device by a hinged suspension arm having at least one hinge. The IFPD 110 includes a hinged suspension arm 116 having hinge 117 and hinge 118 both rotatable 360 degrees about a vertical axis. Hinges 117 and 118 allow the podium surface 119 to be extended away from the IFPD device and in an orientation adjustable to the user's preference. The rear view of the fully integrated IFPD device 120, illustrates a mounting apparatus 125 for the flat panel display 111. The flat panel display 111 is adjustable upwardly and downwardly with respect to a horizontal axis via a vertical telescoping arm 126. The adjustable upward and downward movement of the flat panel display can be accomplished by any device know to one of skill in the art that allows the flat panel display to adjusted upwardly and downwardly and locked into position. For example, 126 may be a slide with locking mechanism, a hydraulic lift, cranking mechanism, and the like. The side and top views of the fully integrated IFPD device are illustrated at 130A, 130B, and 140 respectively.

FIG. 1B illustrates the fully integrated IFPD device with the podium surface in an extended position. The rear view of the fully integrated IFPD device 120 illustrates the podium surface 142, the second touch screen panel 143, and the image capture device 144. The second touch screen panel 143 is connected to an embedded computer (not shown). In a preferred embodiment of the invention, the computer is any computer integrated with or electronically coupled to a touchscreen interface with an operating system such as Apple iOS, Microsoft Windows, or Google Android, among others, the implementation of which are readily apparent to one of ordinary skill in the art. The second touch screen panel 143 can be any display panel with touch screen capabilities. In some embodiments, the second touch screen panel is itself a computer, laptop, tablet, etc. with touch screen capabilities. In this embodiment, an embedded computer is not required as the second touch screen panel provides the computing hardware and software necessary to operate the fully integrated IFPD device. Regardless, the embedded computer synchronizes the display on the flat panel display 111 and any other display such as the display on the second touch screen panel 143. That way a user can see the same display via the second touch screen panel (in the podium) as that displayed on the flat panel display 111 (e.g., behind the user).

The side views, 130A and 130B, and top view 140 provide alternate views of the fully integrated IFPD device including the podium surface 142, the second touch screen panel 143, the image capture device 144, and the extended hinged suspension arm 116 with hinge 117 facilitating the extension of the podium surface 142 away from the flat panel display 111. The top view of the fully integrated IFPD device 140 also illustrates the podium surface 142 in an orientation about hinge 118 of the extended hinged suspension arm 116. In this orientation, the podium surface 142 is in a position away from the viewing area of the flat panel display 111.

Figure 2:
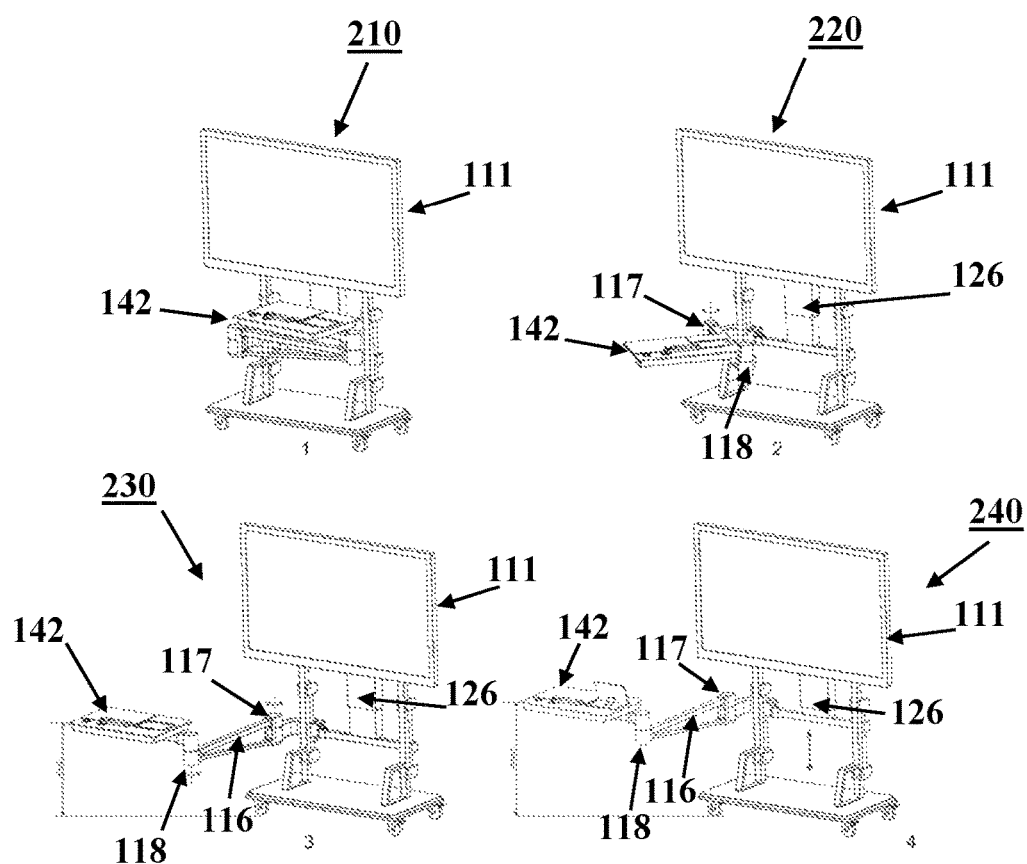
FIG. 2 illustrates a front view of the fully integrated IFPD device with an extended hinged suspension arm of the podium surface rotatable about a vertical axis and the flat panel display adjustable upwardly and downwardly with respect to a horizontal axis.

FIG. 2 illustrates a front view of the fully integrated IFPD device with an extended hinged suspension arm of the podium surface rotatable about a vertical axis and the flat panel display adjustable upwardly and downwardly with respect to a horizontal axis. FIG. 2 illustrates multiple front views of the fully integrated IFPD device 200 in various orientations. For example, 210 illustrates the device with the flat panel display 111 in a lowered position and the podium surface 142 in a retracted position. 220 illustrates the device with the flat panel display 111 in a raised position via the vertical telescoping arm 126 and the podium surface 142 in an extended position via the rotation about a vertical axis of hinges 117 and 118 of the hinged suspension arm. 230 illustrates the device with the flat panel display 111 in a raised position via the vertical telescoping arm 126 and the podium surface 142 in a further extended position via the rotation about a vertical axis of hinges 117 and 118 of the hinged suspension arm 116. 240 illustrates the device with the flat panel display 111 in a lowered position via the vertical telescoping arm 126 and the podium surface 142 in a further extended position via the rotation about a vertical axis of hinges 117 and 118 of the hinged suspension arm 116.

Figure 3:
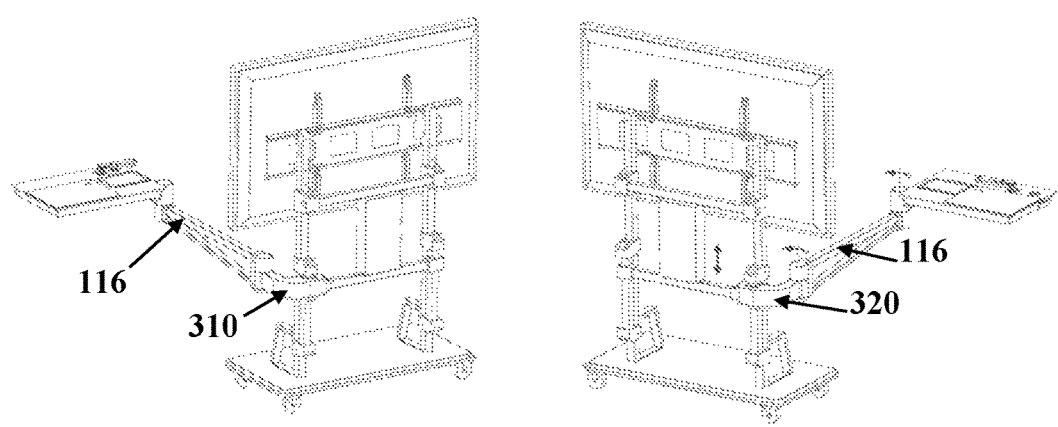
FIG. 3 illustrates a rear view of the fully integrated IFPD device with an extended hinged suspension arm rotatable about a vertical axis and the podium surface rotatable about a vertical axis.

FIG. 3 illustrates a rear view of the fully integrated IFPD device with an extended hinged suspension arm rotatable about a vertical axis and the podium surface rotatable about a vertical axis. The fully integrated IFPD device is configurable to place the hinged suspension arm 116 on either side of the device at 310 or 320. In an alternative embodiment, the suspension arms, mounting device, etc. are modular and configurable to suit the needs of a particular application.

Figure 4:
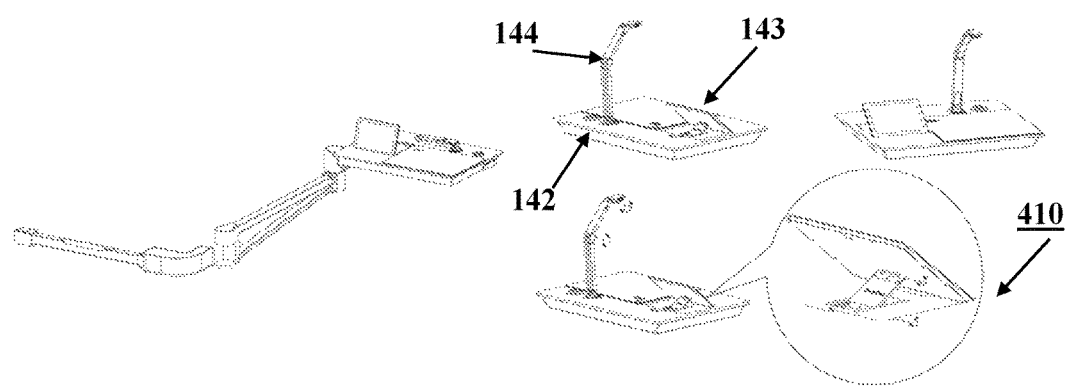
FIG. 4 illustrates the podium surface with integrated second touch screen display and image display device according to an embodiment of the invention.

FIG. 4 illustrates the podium surface with integrated second touch screen panel and image display device according to an embodiment of the invention. The podium surface 142 may include a plurality of integrated devices. For purposes of this description, the podium surface 142 will be described with respect to two devices: a second touch screen panel 143 and an image capture device 144. The second touch screen panel 143 may be integrated with the podium surface 142 and capable of being raised (as seen in 410) relative to the top surface of the podium surface 142. In a closed position, the touch screen panel 143 may be level with the top surface of the podium surface 142 or below the level of the top surface of the podium surface 142. The image capture device 144 may be an image capture device such as a document camera with an adjustable arm (with one or two pivot points) such as those disclosed in U.S. Pat. Nos. D715,300 and D677,707, which can be modified to be integrated with the podium surface 142. In an alternative embodiment, the image capture device 144 is removably attached to the podium surface 142.

In an embodiment of the invention, the image capture device 144 comprises a document camera the can magnify and project the video image of documents and three-dimensional objects placed on the podium surface 142. In an exemplary embodiment of the invention, the document camera comprises optics, camera, an optional lighting system, and a motherboard with appropriate firmware. Simple or highly complex optical system can be used. The camera preferably a progressive scan camera, e.g., a charge-coupled device (CCD) sensor or complementary metal-oxide semiconductor (CMOS) sensor, to provide high-resolution color images at thirty (30) frames per second or more. A lighting system may be used to illuminate the writing surface. The motherboard may have a variety of connections to output video such as HDMI, DVI, VGA, USB, and/or LAN, the implementation of which are apparent to one of ordinary skill in the art. The document camera may also be equipped with wireless technology such as, but not limited to WIFI to eliminate the need for cables. The term document camera as used herein means a device as noted above that can direct its camera toward the podium surface, preferably from vertically overhead the podium surface.

An advantage of the present invention is that the fully integrated nature of the image display device, embedded computer, and second touch screen panel allows the cables of all devices to be concealed within the hinged suspension arm and mounting apparatus of the device thereby hidden from view. In an embodiment of the invention, the image display device, embedded computer, and second touch screen panel communicate with each other and the flat panel display wirelessly, for example, via IEEE 802 protocol, Bluetooth, or ZigBee. The document camera 144 can acquire video via the embedded computer (or alternatively the second touch screen panel acting itself as a computer, laptop, tablet, etc.) as described in U.S. Pat. No. 8,508,751, the entire disclosure of which is incorporated by reference herein. The embedded computer provides a platform for interactive learning applications (or "apps") to run, access to a network, and/or teaching modules. These apps may include, but are not limited to: digital text books, a classroom response system, test facilitators, social networking apps, email, homework submission apps, productivity apps, and cloud server apps (for enabling, for example, online storage, bookmarking in text books, etc.).

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. An interactive flat panel display (IFPD) device comprising:
    flat panel display comprising a first interactive touch screen;
    a portable mounting apparatus supporting the flat panel display;
    a podium structurally coupled to the portable mounting apparatus;
    a computer structurally coupled to the portable mounting apparatus, wherein the computer comprises a second interactive touch screen and is electronically communicatively coupled to the flat panel display; and
    an image capture device communicatively coupled to the computer;
    wherein the second interactive touch screen is detachably and hingedly coupled to the top surface of the podium;
    wherein the computer provides content to the flat panel display and synchronizes display on the first interactive touch screen and display on the second interactive touch screen;
    wherein the second interactive touch screen is rotatable toward the flat panel display; and
    wherein the image capture device is independently rotatable from the second interactive touch screen.

2. The IFPD device of claim 1, wherein a height of the flat panel display is adjustable via the portable mounting apparatus.

3. The IFPD device of claim 1, wherein the podium is pivotable about a horizontal and vertical axis.

4. The IFPD device of claim 1, wherein the image capture device is a document camera.

5. The IFPD device of claim 1, wherein the second interactive touch screen is located within the podium and is configured to interact with content on the flat panel display.

6. The IFPD device of claim 1, wherein the portable mounting apparatus comprises wheels.

7. The IFPD device of claim 4, wherein the image capture device is integrated into the podium.

8. The IFPD device of claim 7, wherein the image capture device is configured to view a top surface of the podium or an object placed thereon.

9. The IFPD device of claim 1, wherein the second interactive touch screen remains operable after being detached from the podium.

10. An interactive flat panel display (IFPD) device comprising:
    flat panel display oriented in a first direction;
    a portable mounting apparatus supporting the flat panel display;
    a podium structurally coupled to the portable mounting apparatus;
    an interactive touch screen communicatively coupled to the flat panel display;
    a computer communicatively connected to the flat panel display and the interactive touchscreen; and
    an image capture device;
    wherein the interactive touch screen is hingedly attached to the podium and is orientateable to a direction other than the first direction;
    wherein the computer provides content to the flat panel display and the interactive touch screen; and
    wherein the image capture device is a document camera orientatable independent of the interactive touch screen.

* * * * *